(12) United States Patent
Hull

(10) Patent No.: US 6,175,175 B1
(45) Date of Patent: Jan. 16, 2001

(54) LEVITATION PRESSURE AND FRICTION LOSSES IN SUPERCONDUCTING BEARINGS

(75) Inventor: John R. Hull, Downers Grove, IL (US)

(73) Assignee: The University of Chicago, Chicago, IL (US)

(*) Notice: Under 35 U.S.C. 154(b), the term of this patent shall be extended for 0 days.

(21) Appl. No.: 09/393,246

(22) Filed: Sep. 10, 1999

(51) Int. Cl.[7] .................................................. H02K 7/09
(52) U.S. Cl. ........................ 310/90.5; 310/156; 505/876; 505/166
(58) Field of Search .................. 310/90.5, 156; 505/876, 877, 166, 150, 234, 700, 727

(56) References Cited

U.S. PATENT DOCUMENTS

| | | | |
|---|---|---|---|
| 5,038,127 | * | 8/1991 | Dersch ................................ 505/150 |
| 5,177,387 | * | 1/1993 | McMichael ......................... 310/90.5 |
| 5,739,606 | * | 4/1998 | Takahata et al. ................... 310/90.5 |
| 5,747,426 | * | 5/1998 | Abboud .............................. 310/90.5 |
| 5,763,971 | * | 6/1998 | Takahata et al. ................... 310/90.5 |
| 5,789,837 | * | 9/1998 | Shin et al. .......................... 310/90.5 |
| 5,801,469 | * | 9/1998 | Takahata et al. ................... 310/90.5 |
| 5,838,082 | * | 11/1998 | Ito et al. ............................. 310/90.5 |

OTHER PUBLICATIONS

Low Rotational Drag In High–Temperature Superconducting Bearings, J. R. Hull, T. M. Mulcahy, K.L. Uherka, and R. G. Abboud, Jun., "IEEE Transactions on Applied Superconductivity" 1995 vol. 5, No. 2, pp. 1,2,3,4.

A Permanent–Magnet Rotor for a High–Temperature Superconducting Bearing, Thomas M. Mulcahy, John R. Hull, Kenneth L. Uherka and Robert G. Abboud, "IEEE Transactions on Magnetics" Jul., 1996, vol. 32, No. 4.

* cited by examiner

*Primary Examiner*—Burton Mullins
(74) *Attorney, Agent, or Firm*—Michael D. Rechtin; Foley & Lardner (57) ABSTRACT

A superconducting bearing having at least one permanent magnet magnetized with a vertical polarization. The lower or stator portion of the bearing includes an array of high-temperature superconducting elements which are comprised of a plurality of annular rings. An annular ring is located below each permanent magnet and an annular ring is offset horizontally from at least one of the permanent magnets. The rings are composed of individual high-temperature superconducting elements located circumferentially along the ring. By constructing the horizontally-offset high-temperature superconducting ring so that the c-axis is oriented in a radial direction, a higher levitation force can be achieved. Such an orientation will also provide substantially lower rotational drag losses in the bearing.

23 Claims, 10 Drawing Sheets

LEVITATION PRESSURE AND FRICTION LOSSES IN SUPERCONDUCTING BEARINGS

This invention was made with government support under Contract No. W-31-109-ENG-38 awarded by the Department of Energy. The Government has certain rights in this invention.

BACKGROUND OF THE INVENTION

This invention relates generally to improvements in the performance of high-temperature superconducting bearings. More particularly, this invention relates to improvements in the levitation pressure and reductions in friction losses in superconducting bearings.

One type of superconducting thrust bearing comprises a double-ring permanent magnet that is levitated over an array of high-temperature superconducting elements. The rotating part of such a bearing consists of an outer permanent magnet ring and an inner permanent magnet ring which are connected by a ferromagnetic annular disc. This disc serves as a low reluctance path along the top of the ring pair. Both of these rings are magnetized with a vertical polarization and in opposite directions. The stator part of the bearing consists of an array of high-temperature superconducting elements. These elements can be formed in a variety of shapes. For example, this array can be composed of a set of three annular rings with each of the rings comprised of individual high-temperature superconducting elements that are located circumferentially along each ring. In one arrangement, all of the high-temperature superconducting elements would have the same crystalline orientation with the c-axis of each element being vertical.

Such array arrangements, although reasonably effective, also result in some velocity dependent loss in the bearing. In order to produce levitation, high-temperature superconducting elements must be magnetized. Because these elements are discrete and are magnetized by macroscopic circulating currents, they are most strongly magnetized towards the center of each element. As the permanent magnet rotates above the array, the magnetized high-temperature superconducting elements produce an effective alternating current magnetic field over the permanent magnet which causes eddy currents to flow in the permanent magnet contributing to rotational loss. This loss will be proportional to the rotational velocity.

Ideally, one would like to use a monolithic block of a high-temperature superconductor with shielding currents to improve the levitation pressure and eliminate the eddy current production in the permanent magnets. There have been several attempts to achieve such an ideal situation but all have their drawbacks. A sintered high-temperature superconductor could be made of large enough size to establish the electrical current pattern for the ideal situation. Unfortunately, however sintered high-temperature superconductors have a relatively small critical-current density and do not produce a large levitation force. Melt-textured high-temperature superconductors are often used to obtain a large levitation force, but they cannot be economically grown to a sufficiently large size desired for the permanent magnet; and techniques to join elements together have not been developed thus far.

As a consequence of these restrictions, high-temperature superconducting elements must be arranged in an array. When in an array, the tiling arrangement of the high-temperature superconductor rings is critical for the levitation forces generated. Each individual tile has an electrical current running inside it in a loop. The axis about which this current loop flows, or c-axis, is critical for forming an effective arrangement. For a double-ring permanent magnet system, one possible tiling arrangement has the c-axis of each element oriented vertically. In such an arrangement, the elements in the center ring will have two current loops that flow in opposite directions as a result of the magnetic fields exerted on the center ring elements by the two permanent magnets. Under this arrangement, however, the elements are less effective levitators because adjacent currents will flow in opposite directions along the edge of adjacent elements and essentially partially offset each other in terms of levitation force. Thus this portion of the high-temperature superconducting element is not very useful for levitation. Additionally, these currents result in a decrease in the magnetic field immediately above that element edge. This causes the alternating current component of the magnetic field and a velocity dependent loss in the bearing rotation due to the eddy currents induced in the permanent magnet.

SUMMARY OF THE INVENTION

It is therefore an object of the invention to provide an improved low loss high-temperature superconducting journal bearing that can be used to achieve a high efficiency, flywheel, energy storage device.

It is another object of this invention to provide an improved low loss high-temperature superconducting thrust bearing that can be used to achieve a high efficiency, flywheel, energy storage device.

It is another object of this invention to provide an improved tiling pattern and crystalline orientation in a high-temperature superconducting array to increase the levitation force and reduce eddy currents in a permanent magnet.

These and other objects, advantages and features of the invention, together with the organization and manner of operation thereof, will become apparent from the following detailed description when taken in conjunction with the accompanying drawings, wherein like elements have like numerals throughout the drawings described below.

DETAILED DESCRIPTION OF THE PREFERRED EMBODIMENTS

Figure 1:
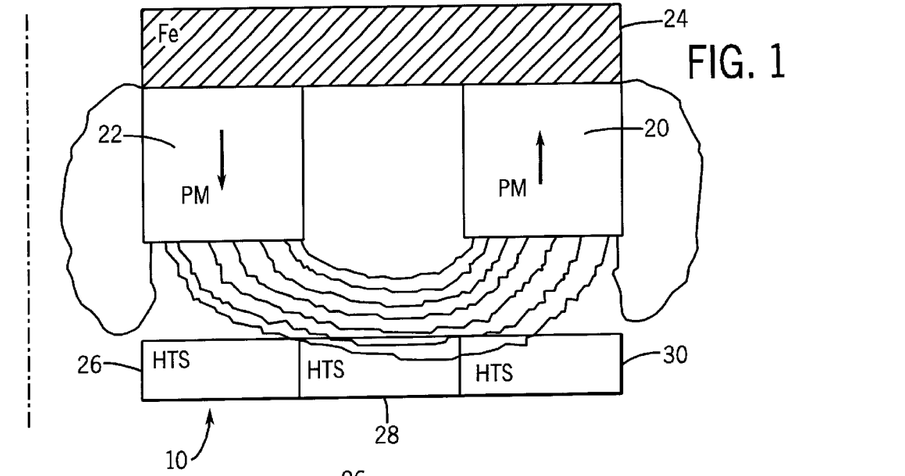
FIG. 1 is a side view (longitudinal section) of one type of superconducting thrust bearing.

In accordance with one form of the invention shown in FIG. 1, a thrust bearing 10 comprises an inner permanent magnet ring 22 and an outer permanent magnet ring 20 connected by a ferromagnetic annular disc 24 which serves as a low reluctance path on top of the pair of rings 22 and 20. The inner permanent magnet ring 22 and the outer permanent ring 20 are magnetized with substantially vertical polarizations and in opposite directions as shown by the respective arrows. The stator part of the bearing 10 includes an array of high-temperature superconducting elements, composed of an inner annular ring 26, a middle annular ring 28, and an outer annular ring 30.

Figure 2:
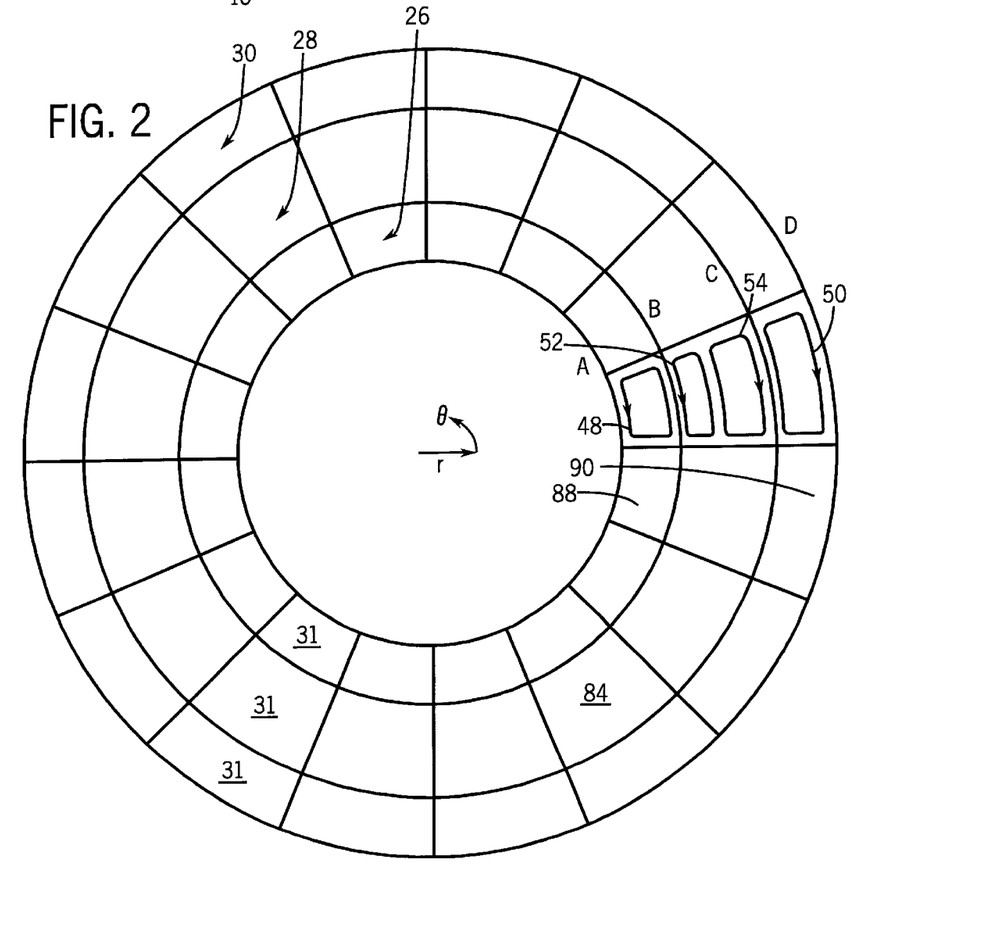
FIG. 2 is a representation of the array arrangement for the high-temperature superconducting elements when in the form of arc segments and the current loops induced in each radial row of the array.

As shown in FIG. 2, each of the annular rings 26, 28, and 30 are composed of individual high-temperature superconducting elements 31 located circumferentially along each of the annular rings 26, 28, and 30. The inner annular ring 26 has a radial thickness of one element 88 with a first current loop 48. The outer annular ring 30 also has a radial thickness of one element 90 as represented by a second current loop 50. The first and second current loops 48 and 50 are formed by the effect of the inner and outer permanent magnets 22 and 20 over the inner and outer annular rings 26 and 30. The middle annular ring 28 also has a radial thickness of one element 84. Because the inner and outer permanent magnets 22 and 20, are magnetized in substantially opposite directions, however, the magnetic fields of each of the magnets attempt to force current loops in opposite directions in the middle element 84. As a result, third and fourth current loops 52 and 54 are formed inside the middle element 84. This makes the associated element 84 in the middle annular ring 28 a less efficient levitator than the associated elements 88 and 90 in the inner and outer annular rings 26 and 30, respectively. It is also noted that the second and fourth current loops 50 and 54 flow in the same direction while the first and third current loops 48 and 52 flow in the same direction but opposite to the second and fourth current loops 50 and 52, respectively. This is due to the relative distances between each of the elements 88, 90, and 84 and the permanent magnets 22 and 20. In each case, the elements 88, 90 and 84 have their current loops 48, 50, 52 and 54 flow in the direction dictated by the closer of the two permanent magnets 22 and 20.

Figure 3:
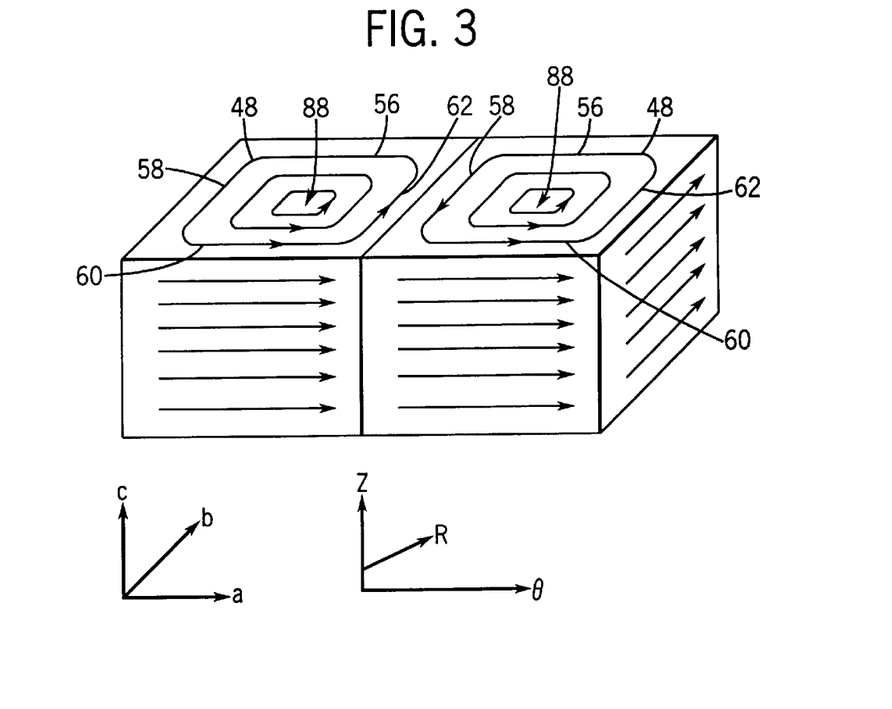
FIG. 3 is an isometric view of two adjacent inner high-temperature superconducting elements with their respective current distributions when configured in conformity with the present invention.
Figure 5:
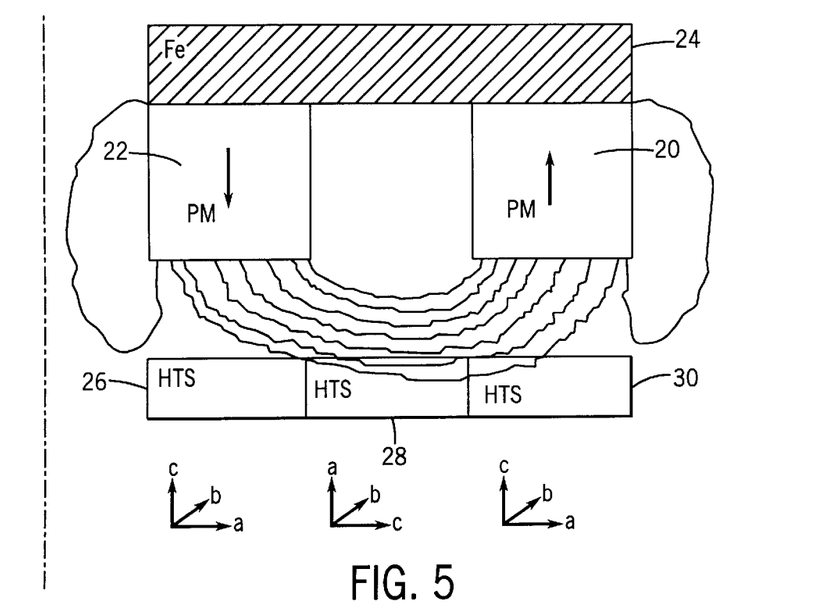
FIG. 5 is a side view (longitudinal section) of the high-temperature superconducting array for a double-ring permanent magnet system in the present invention.
Figure 14:
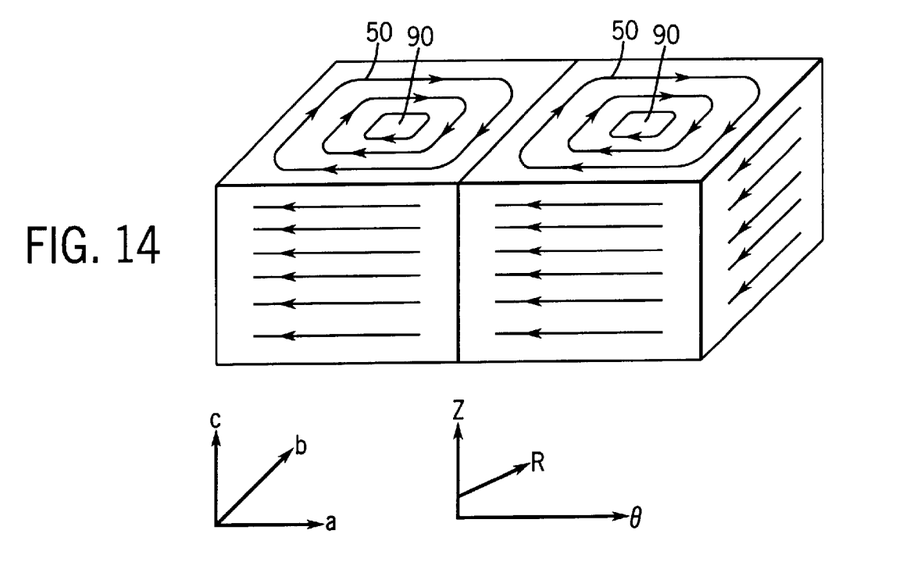
FIG. 14 is an isometric view of two adjacent outer high temperature superconducting elements with the respective current distributions.

In a preferred embodiment of the invention as shown in FIG. 5, the inner and outer high-temperature superconducting element rings 26 and 30 are located substantially directly below the permanent magnets 22 and 20. The middle high-temperature superconducting element ring 28 is offset horizontally from the permanent magnets 22 and 20. In this arrangement, the c-axis of each of the inner and outer high-temperature superconducting elements 88 and 90 are pointed substantially vertically as shown in FIGS. 3 and 14. That is, the c-axis of each of the elements 88 and 90 point towards the permanent magnets 22 and 20. For the middle high-temperature superconducting elements 84, the c-axis of each element 84 is pointed in the radial direction.

FIG. 3 shows two adjacent inner high-temperature superconducting elements 88 in the inner annular ring 26. The first current loop 48 includes radial outboard, left, radial inboard, and right loop portions 56, 58, 60 and 62, each corresponding to one side of the first current loop 48 In the arrangement as shown in FIG. 3, left loop portion 58 and right loop portion 62 flow in opposite directions along the edge of the element 88, essentially countering each other in terms of levitation force. Because the c-axis of each of the outer high-temperature superconducting elements 90 will also be directed vertically, the result will be the same, as shown in FIG. 14, even though the second current loops 50 will flow in the opposite direction due to the opposite magnetization of the outer permanent magnet 20.

Figure 4:
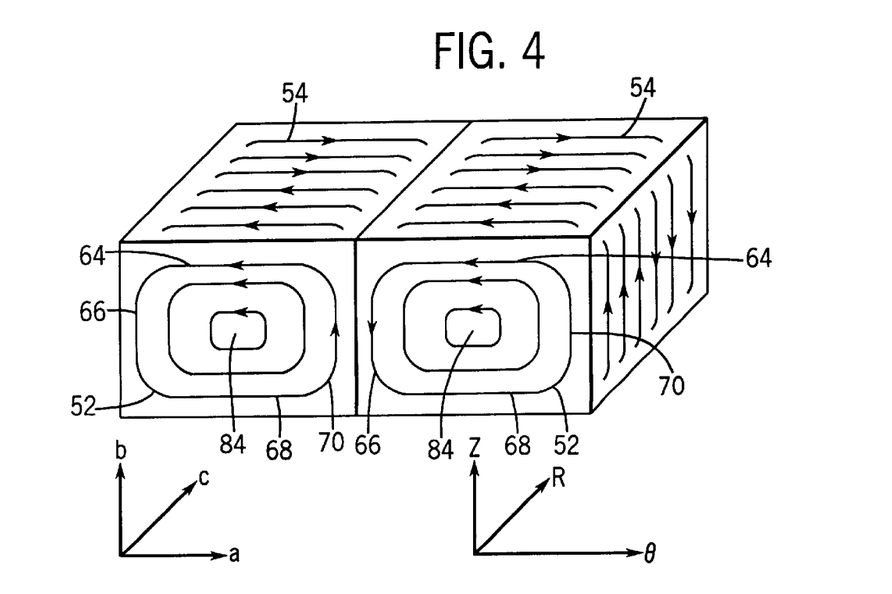
FIG. 4 is an isometric view of two adjacent middle high-temperature superconducting elements with their respective current distributions when configured in conformity with the present invention.

FIG. 4 shows two adjacent middle high-temperature superconducting elements 84 in the middle annular ring 28 as shown in FIG. 4. The c-axis for each of the middle elements 84 is directed in the radial direction. the third current loop 52 comprises top, left, bottom, and right loop portions 64, 66, 68 and 70, each corresponding to one side of the third current loop 52 as shown in FIG. 4. In this arrangement, the left current loop portion 66 and the right current loop portion 70 flow in opposite directions, partially negating one another. The other portions 64 and 68 of the third current loop 52, however, flow in substantially similar directions. This results in an improved levitation force and less rotational drag when compared to the arrangement shown in FIG. 3. This arrangement in FIG. 4 also results in less inhomogeneity of the magnetic field that the permanent magnets experiences and thus, less rotational drag at higher speeds. This is due to the fact that the counterflowing current associated with the current portions 62 and 66 flow away from the permanent magnets 22 and 20 and, therefore, the inhomogeneity due to the adjacent currents from the loop portions 62 and 66 will be less than that due to adjacent currents in the loop portions 62 and 66 in FIG. 3. In other words, the magnetic field from a finite current carrying filament at some distance away from the end of the filament in the direction of the filament is greatly reduced from the magnetic field that is the same distance from the middle of the filament in a direction perpendicular to the filament. The fourth current loops 54 flow in the opposite direction, although the result is substantially the same due to the radial orientation of the c-axis of the middle elements 84.

The orientation described above can be generalized for a variety of high-temperature superconducting element arrays as follows: if the high-temperature superconducting element 26 is substantially underneath the permanent magnet 22 that is vertically magnetized, then the high-temperature superconducting element 26 should have its c-axis oriented substantially vertically. If the high-temperature superconducting element 28 is offset horizontally from the permanent magnet 22 pole, it should have its c-axis oriented substantially radially. It should be noted that for each of the embodiments herein described, the orientation of the c-axis of any of the high-temperature superconducting elements 26 and 28 can vary as much as about ten degrees from center while still achieving substantially the same beneficial result.

Figure 6:
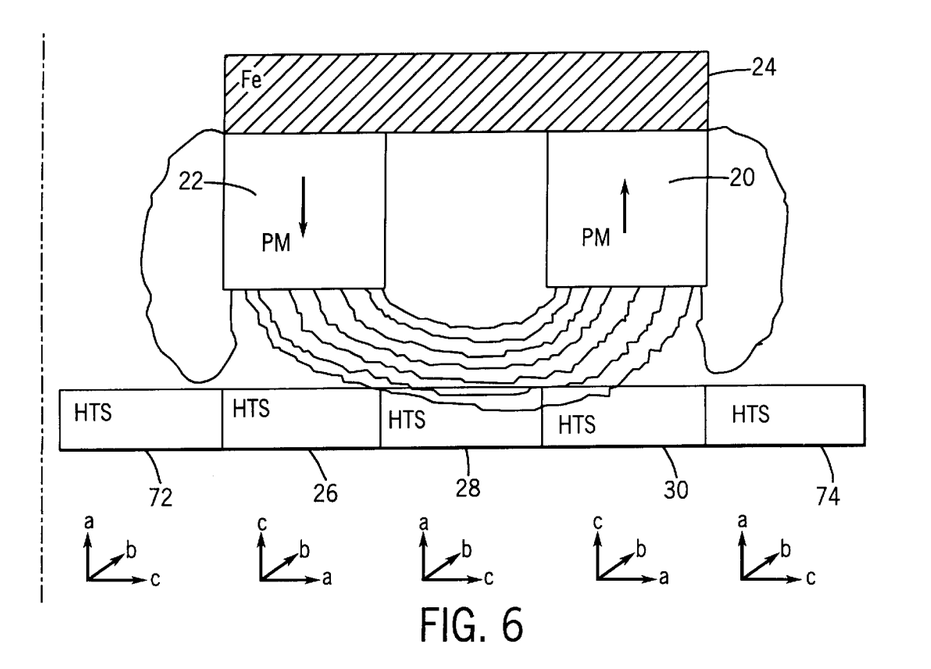
FIG. 6 is a side view (longitudinal section) of a high-temperature superconducting array for a double-ring permanent system with an expanded array.

In an alternate embodiment of the invention as shown in FIG. 6, there is shown a high-temperature superconducting array for a double-ring permanent magnet system with an expanded array. This arrangement should provide slightly more levitation force. This system includes high-temperature superconducting element rings 26, 28, 30, 72, and 74. For the high-temperature superconducting element rings 26 and 30, which are below the permanent magnet rings 22 and 20, the c-axis of each such element will be preferably oriented vertically. For the high-temperature superconducting element rings 28, 72, and 74, the c-axis of each element will be preferably oriented substantially radially.

Figure 7:
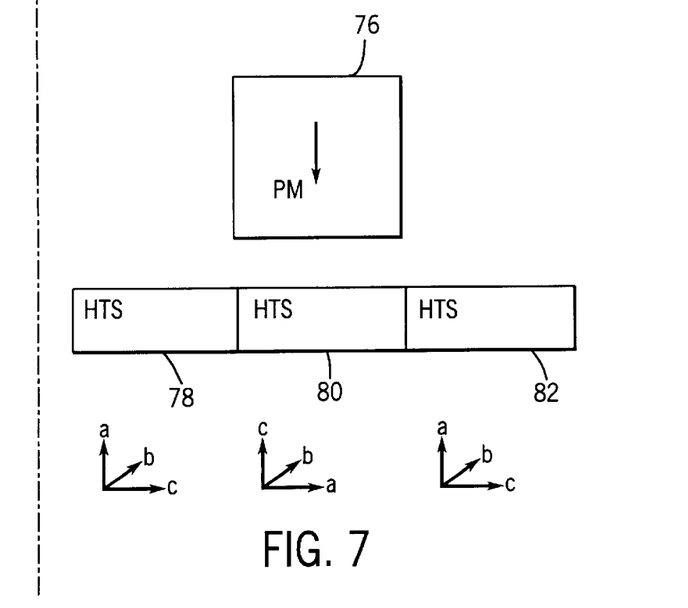
FIG. 7 is a side view of a high-temperature superconducting array with a single ring permanent magnet system.

In yet another embodiment of the invention that is shown in FIG. 7, there exists only one permanent magnet ring 76 and three high-temperature superconducting element rings 78, 80, and 82. In this system, the high-temperature superconducting element ring 80 will preferably have the c-axis of each element oriented substantially vertically, while the high-temperature superconducting element rings 78 and 82 will preferably have the c-axis of each element oriented substantially radially.

In a variation on the preferred embodiment of the invention as shown in FIG. 2, the individual high-temperature superconducting elements 84, 88, and 90 have the shape of arc segments, forming the continuous high-temperature superconducting element rings 28, 26, and 30. As shown in FIGS. 9 through 12, however, the high-temperature superconducting rings 28, 26, and 30 do not necessarily need to be continuous, and the arrangement can be easily modified to apply to high-temperature superconducting arrays in which the superconducting elements 84, 88, and 90 are of more irregular shapes. For example, the shapes can include squares, rectangles, hexagonal parallelepipeds, and cylinders, among others.

Figure 13:
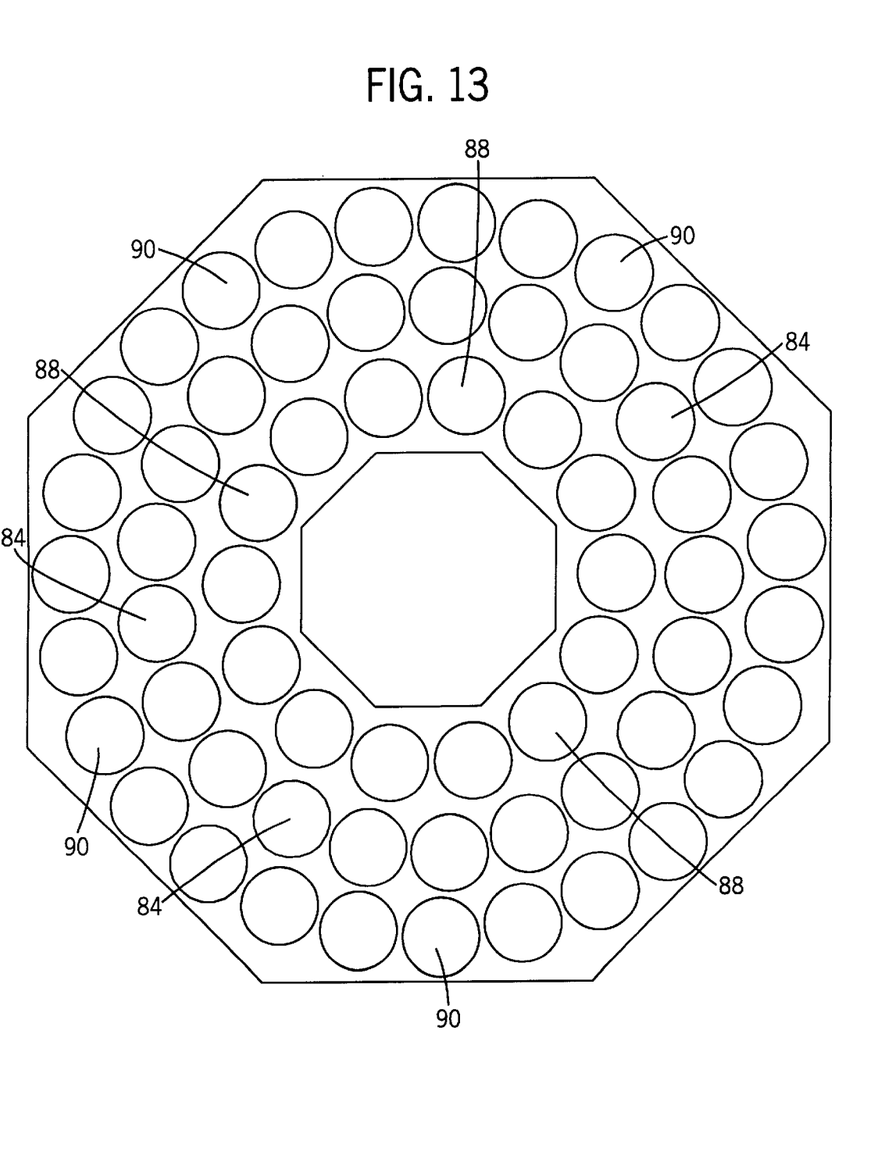
FIG. 13. is a representation of a high-temperature superconductor array when the outer element ring has the shape of a polyhedron.

In the preferred embodiment of the invention the superconductor array has the overall shape of a circle. It is possible, however, for the array to have the shape of a polyhedron, as shown in FIG. 13. Additionally, it is also possible to include more than two permanent magnet rings in other embodiments of this invention.

Figure 8:
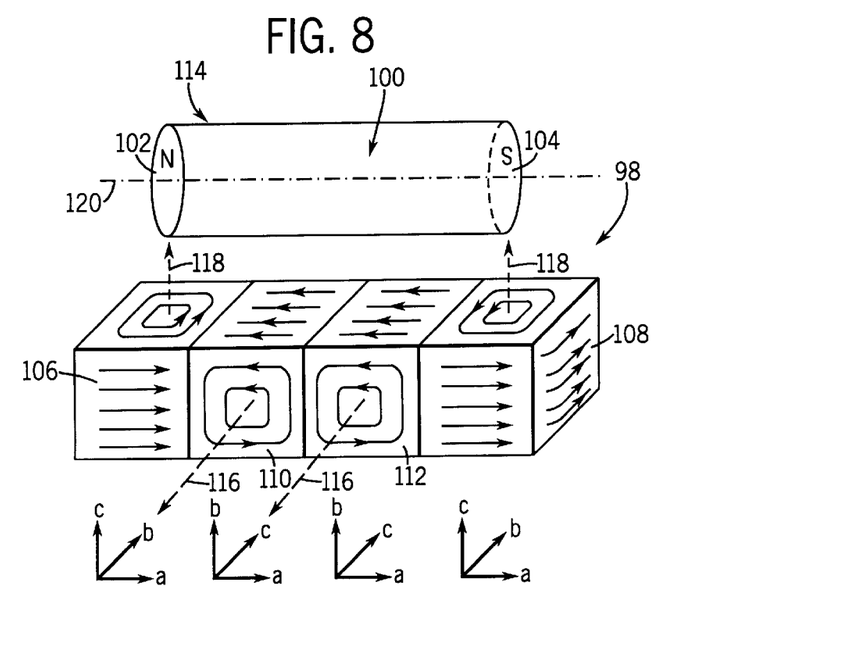
FIG. 8 is an isometric view of a superconducting journal bearing wherein the elements are oriented in accordance with the present invention.
Figure 9:
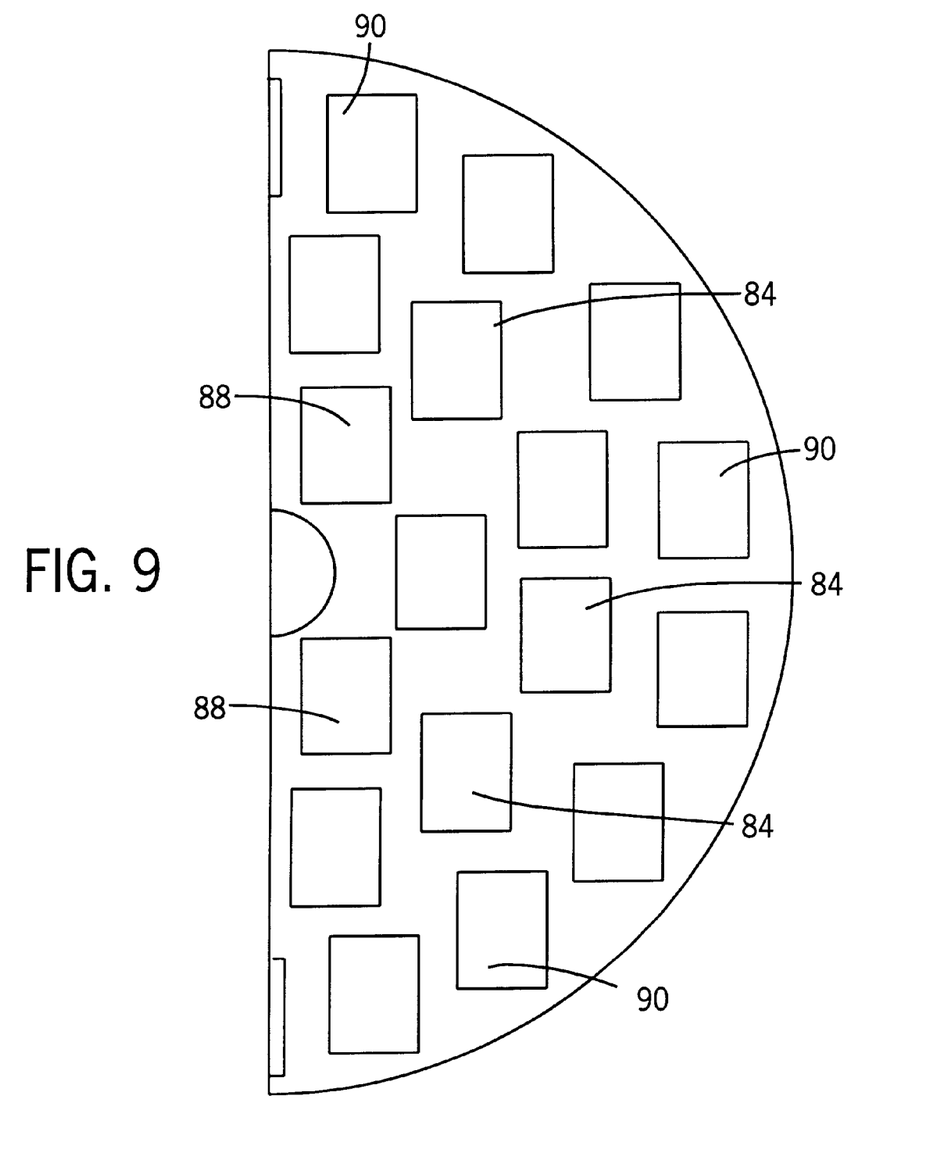
FIG. 9 is a representation of a high-temperature superconducting array when the superconductor elements have a rectangular shape.
Figure 10:
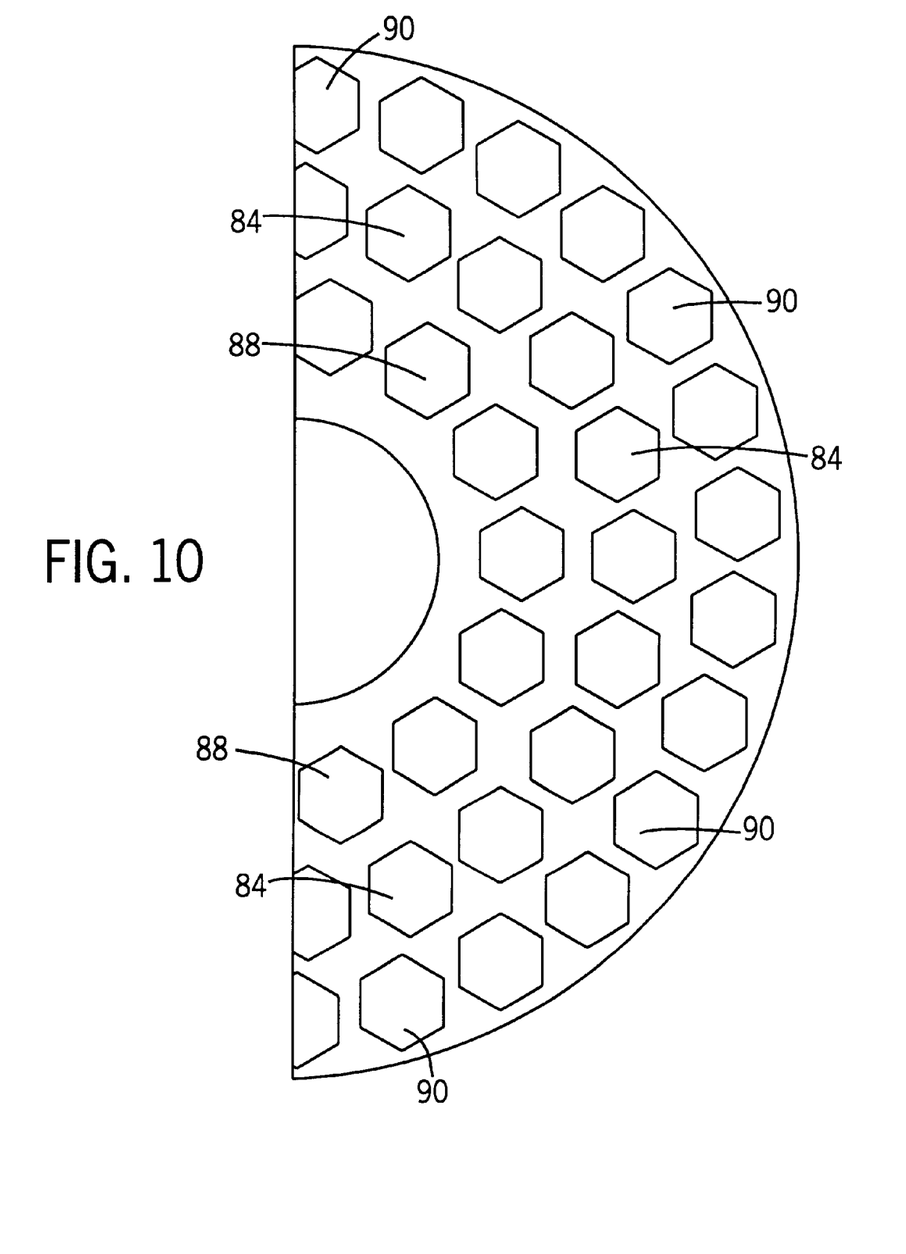
FIG. 10 is a representation of a high-temperature superconducting array when the superconductor elements have a hexagonal shape.
Figure 11:
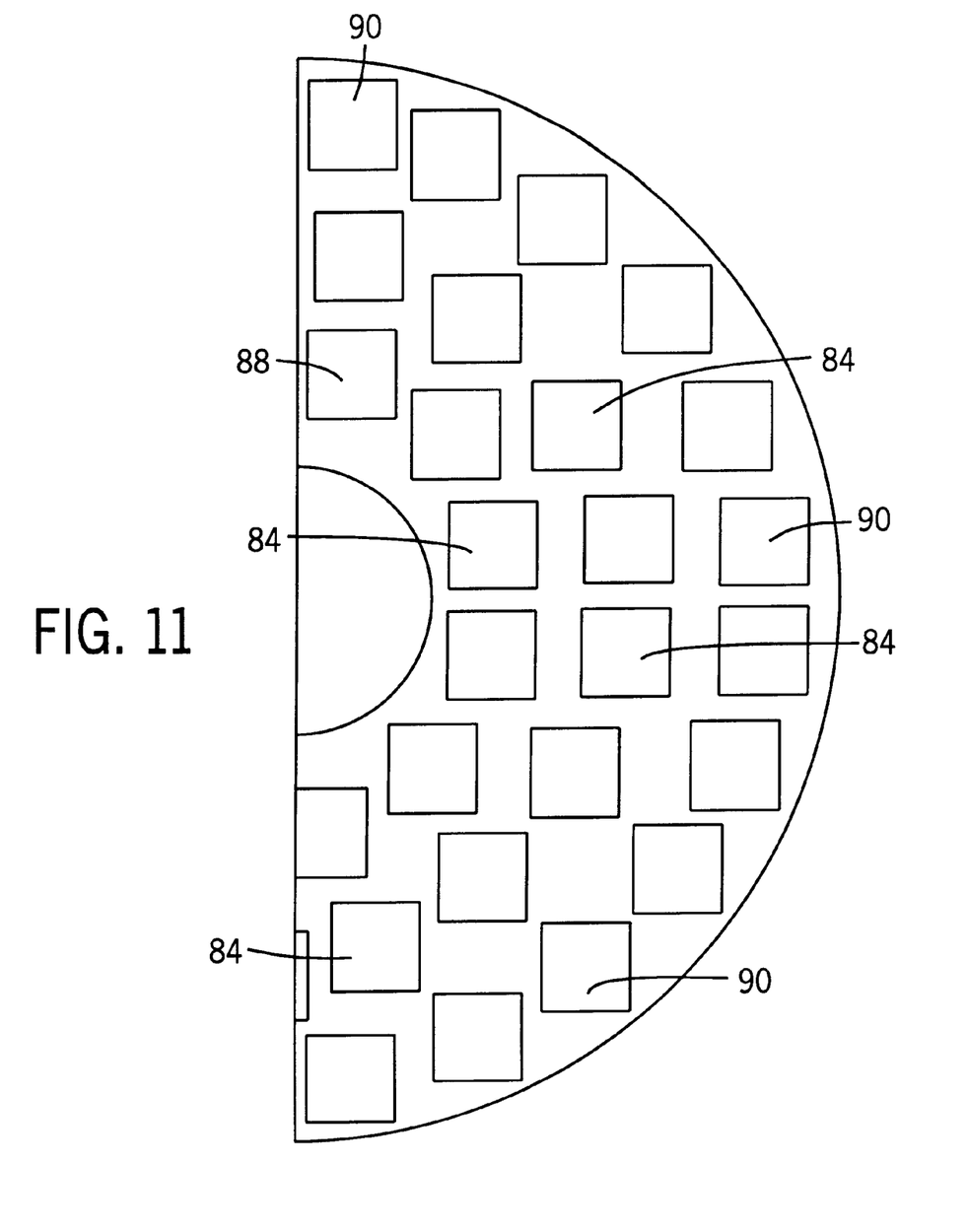
FIG. 11 is a representation of a high-temperature superconducting array when the superconductor elements have a square shape.
Figure 12:
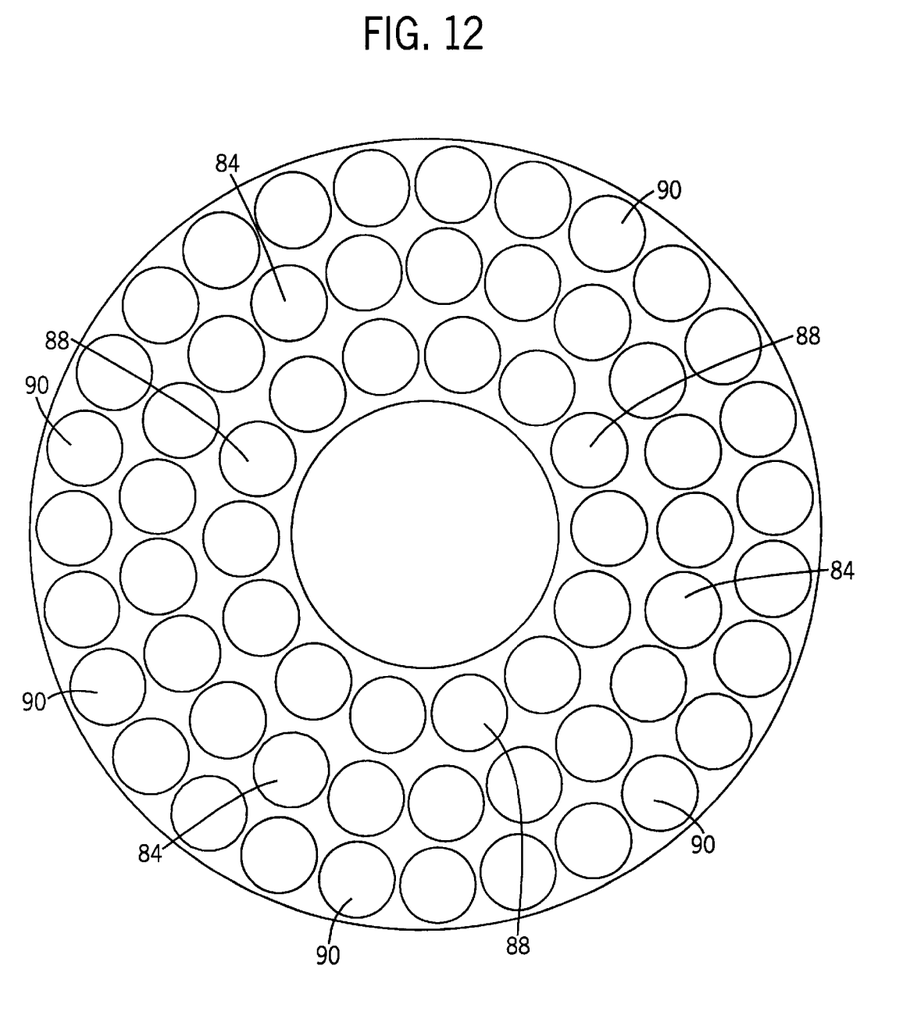
FIG. 12 is a representation of a high-temperature superconducting array when the superconductor elements have a circular shape.

Additionally, the method described above can be applied to a journal bearing 98 as shown in FIG. 8. The bearing 98 includes a rotatable permanent magnet 100 which consists of a cylinder 114 with an axis of rotation 120 in the horizontal plane with a north magnetic pole 102 and a south magnetic pole 104. Under the magnetic poles 102 and 104 are stator high-temperature superconducting elements 106 and 108, respectively. One or more high-temperature superconducting elements 106 and 108 have each c-axis 118 oriented substantially vertically. One or more stator high-temperature superconducting elements 110 and 112 are located between the elements 106 and 108. The stator high-temperature superconducting elements 110 and 112 have their c-axis 116 horizontal and perpendicular to the axis of rotation. This geometry provides a larger levitation force than if the c-axis 116 of the elements 110 and 112 have are oriented vertically. Unlike the thrust bearing arrangements previously described, however, the improved c-axis alignment in the journal bearing 98 does not greatly reduce any currents on the permanent magnet 100 because of the rotation of the permanent magnet 100. This rotation causes any off-axis part of the permanent magnet 100 to experience a low magnetic field at its upper-most point, increasing to a higher magnetic field at its lowest point. Thus, the permanent magnet 100 sees a fluctuating magnetic field from the high-temperature superconducting array that is independent from the orientation of the individual elements 106, 108, 110, and 112. Due to the larger levitation force, however, it is possible either to increase the levitated mass or to reduce the amount of the high-temperature superconducting elements 106, 108, 110, and 112 required to levitate the same amount of mass.

While preferred embodiments have been shown and described, it should be understood that changes and modifications can be made therein without departing from the invention in its broader aspects. Various features of the invention are defined in the following claims.

What is claimed is the following:

1. A bearing, comprising:
   an array of high-temperature superconducting elements; and
   at least one permanent magnet, its axis of revolution and axis of magnetization being substantially pointed towards the array of high-temperature superconducting elements,
   wherein the c-axis of every domain of each one of the high-temperature superconducting elements located below the at least one permanent magnet is oriented substantially along the axis of magnetization of the permanent magnet, and the high-temperature superconducting elements offset horizontally from the permanent magnet have each c-axis substantially oriented in the radial direction perpendicular to the axis of magnetization of the permanent magnet.

2. The bearing of claim 1 wherein the at least one permanent magnet comprises a single cylinder which is magnetized axially.

3. The bearing of claim 1 wherein the at least one permanent magnet comprises a ring which is magnetized axially.

4. The bearing of claim 3 further comprising a second permanent magnet, wherein the permanent magnets comprise concentric rings which are magnetized axially.

5. The bearing of claim 4 further comprising a third permanent magnet ring.

6. The bearing of claim 4 wherein at least one of the first and second permanent magnets includes an iron return path.

7. The bearing of claim 4 further comprising at least one high-temperature superconducting element ring disposed outside the outermost permanent magnet ring.

8. The bearing of claim 4 further comprising at least one high-temperature superconducting element ring disposed inside the innermost permanent magnet ring.

9. The bearing of claim 1 wherein the high-temperature superconducting elements have a rectangular shape.

10. The bearing of claim 1 wherein the high-temperature superconducting elements have a shape selected from the group consisting of a square shape, a cylindrical shape, a triangular shape, a hexagonal parallelepiped shape, and mixtures thereof.

11. The bearing of claim 1 wherein the high-temperature superconducting elements are shaped to form continuous rings.

12. The bearing of claim 1 wherein the high-temperature superconducting elements are arc-shaped.

13. The bearing of claim 1 wherein the high-temperature superconducting elements are shaped to form non-continuous rings.

14. The bearing of claim 1 wherein the combination of the at least one permanent magnet and the high-temperature superconducting elements forms a thrust bearing.

15. The bearing of claim 1 wherein the orientation of the c-axis of the high-temperature superconducting elements disposed below the permanent magnet is within about ten degrees of the axis of magnetization of the permanent magnet.

16. The bearing of claim 1 wherein the orientation of the c-axis of each of the high-temperature superconducting elements offset horizontally from the permanent magnet is with in about ten degrees from being perpendicular to the axis of magnetization of the permanent magnet.

17. A bearing comprising:

at least one permanent magnet; and an array of high-temperature superconducting elements, wherein the array comprises concentric rings subdivided azimuthally, with at least one high-temperature superconducting element disposed below the poles of the at least one permanent magnet being oriented with the c-axis of each such element vertically and with at least one high-temperature superconducting element offset horizontally from the poles of the at least one permanent magnet being oriented with the c-axis of each such element in the radial direction.

18. The bearing of claim 17, wherein the at least one permanent magnet is ring-shaped, and the array includes a ring of high-temperature superconducting elements located below and outside the at least one permanent magnet.

19. The bearing of claim 17, wherein the at least one permanent magnet is ring-shaped, and the array includes a ring of high-temperature superconducting elements located below and inside the at least one permanent magnet.

20. The bearing of claim 17, wherein the orientation of the at least one high-temperature superconducting element below the permanent magnet is within about ten degrees of the axis of magnetization of the permanent magnet.

21. A bearing, comprising:

a rotatable permanent magnet in the form of a cylinder with an axis of rotation in the horizontal plane, the rotatable permanent magnet having a north magnetic pole, a middle portion and a south magnetic pole;

at least one high-temperature superconducting element under the face of the north pole, each of the at least one element having a single c-axis for each domain in the at least one element and oriented substantially vertically;

at least one high-temperature superconducting element under the face of the south pole, each of the at least one element having a single c-axis for each domain in the at least one element and oriented substantially vertically; and at least one high-temperature superconducting element located between the high-temperature superconducting elements under the faces of the north and south poles, each high-temperature superconducting element located between the north and south poles having its c-axis horizontal and perpendicular to the axis of rotation of the permanent magnet.

22. The bearing of claim 21 wherein two high-temperature superconducting elements are located below the middle portion of the permanent magnet.

23. The bearing of claim 21 wherein the combination of the at least one permanent magnet and the high-temperature superconducting elements form a journal bearing.

* * * * *